United States Patent
Lee (10) Patent No.: US 8,660,033 B2
(45) Date of Patent: Feb. 25, 2014

(54) APPARATUS AND METHOD FOR PROVIDING SERVICE IN SERVICE ZONE

(75) Inventor: Kwanghoon Lee, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 296 days.

(21) Appl. No.: 12/970,249

(22) Filed: Dec. 16, 2010

(65) Prior Publication Data

US 2012/0082144 A1 Apr. 5, 2012

(30) Foreign Application Priority Data

Sep. 30, 2010 (KR) .................. 10-2010-0095497

(51) Int. Cl.
*H04L 12/28* (2006.01)
*H04W 4/00* (2009.01)
*H04W 24/00* (2009.01)

(52) U.S. Cl.
USPC ........ 370/254; 370/328; 370/338; 455/456.1; 455/456.3

(58) Field of Classification Search
None
See application file for complete search history.

(56) References Cited

U.S. PATENT DOCUMENTS

| 2006/0268743 | A1 | 11/2006 | Yoshida |
| 2008/0316989 | A1* | 12/2008 | Balogh ......................... 370/338 |
| 2009/0097414 | A1* | 4/2009 | Yoon et al. .................... 370/254 |
| 2009/0098888 | A1* | 4/2009 | Yoon .......................... 455/456.2 |
| 2010/0266125 | A1 | 10/2010 | Tanaka et al. |
| 2011/0182250 | A1* | 7/2011 | Shin et al. ..................... 370/329 |
| 2012/0003994 | A1* | 1/2012 | Sylvain ...................... 455/456.1 |

FOREIGN PATENT DOCUMENTS

WO WO 2009/041033 A1 4/2009

* cited by examiner

*Primary Examiner* — Chirag Shah
*Assistant Examiner* — Srinivasa Reddivalam
(74) *Attorney, Agent, or Firm* — Birch, Stewart, Kolasch & Birch, LLP (57) ABSTRACT

A method for providing a service in a service zone comprises: receiving, from an access point, a service set identifier (SSID) or a basic service set identifier (BSSID); when the SSID or the BSSID has been received for a preset time, transmitting, to a server, a message requesting for service identification information corresponding to the received SSID or BSSID; receiving, from the server, the service identification information; and creating an object based on the received service identification information.

6 Claims, 4 Drawing Sheets

APPARATUS AND METHOD FOR PROVIDING SERVICE IN SERVICE ZONE

TECHNICAL FIELD

The present invention relates to an apparatus and a method for providing a service in a service zone, and more particularly, to an apparatus and a method for providing a service in a service zone by using a service set identifier (SSID) broadcast from an access point, without downloading or installing an application.

BACKGROUND ART

Currently, users of mobile terminals have to download or install applications corresponding to each service so as to be provided with various services. For instance, when using a hotel service, a user has to download or install an application corresponding to each hotel (e.g., Hilton Hotel, Marriott Hotel, etc.). This may cause inconvenience to the user.

DISCLOSURE OF THE INVENTION

Therefore, it is an object of the present invention to provide an apparatus and a method for providing a service in a service zone by using a service set identifier (SSID) broadcast from an access point, without downloading or installing an application corresponding to each service.

To achieve these and other advantages and in accordance with the purpose of the present invention, as embodied and broadly described herein, there is provided a method for providing a service in a service zone, the method comprising: receiving, from an access point, a service set identifier (SSID) or a basic service set identifier (BSSID); when the SSID or the BSSID has been received for a preset time, transmitting, to a server, a message requesting for service identification information corresponding to the received SSID or BSSID; receiving, from the server, the service identification information; and creating an object based on the received service identification information.

The method may further comprise displaying the created object on a screen.

The method may further comprise receiving service information corresponding to the service identification information when the object has been executed.

The SSID or the BSSID may comprise a prefix for indicating that a zone casting service is being provided.

The service identification information may comprise at least one of a service name, a service URL and a service icon corresponding to a service zone.

The object may be implemented as a short-cut icon for indicating the service identification information.

The service information may comprise at least one of a service corresponding to the service identification information, a service list, and contents for a corresponding service.

The service information may be received from the server by using a URL when the object has been executed.

To achieve these and other advantages and in accordance with the purpose of the present invention, as embodied and broadly described herein, there is also provided an apparatus for providing a service in a service zone, the apparatus comprising: a receiver configured to receive a service set identifier (SSID) or a basic service set identifier (BSSID) from an access point; a controller configured to transmit, to a server, a message requesting for service identification information corresponding to the received SSID or BSSID when the SSID or the BSSID has been received for a preset time, and configured to create an object based on the service identification information received from the server; and a display unit configured to display the created object under control of the controller.

The controller may control the receiver to receive service information corresponding to a service zone from the server when the object has been executed.

The service information may be received from the server by using a URL when the object has been executed.

In the method for providing a service in a service zone, a user may use pre-stored applications without downloading or installing applications corresponding to each service.

MODES FOR CARRYING OUT THE PREFERRED EMBODIMENTS

Reference will now be made in detail to the preferred embodiments of the present invention, examples of which are illustrated in the accompanying drawings. The suffixes attached to components disclosed in the following description, such as 'module' and 'unit or portion' were used for facilitation of the detailed description of the present invention. Therefore, the suffixes do not have different meanings from each other.

The mobile terminal (mobile communication terminal) 100 may be implemented in various forms such as mobile phones, smart phones, notebook computers, digital broadcast terminals, PDAs (Personal Digital Assistants), PMPs (Portable Multimedia Player), etc. However, it will be obvious to those skilled in the art that the present invention may be also applicable to the fixed terminal such as a digital TV and a desktop computer, except for specific configurations for mobility.

Concept of Zone Casting Service

'Zone Casting Service' indicates a service to provide, from a server, service information corresponding to a service zone when a user has executed a zone casting application (application program) after entering the service zone. Especially, the zone casting service indicates a service to provide customized service information among service information corresponding to the service zone. Here, the customized service information indicates service information useful or necessary to the user in the service zone.

The service zone indicates an area to which a service is provided from a server inside a network established at a specific place or area. For instance, the service zone may be a specific place such as a department store, a theater and a hotel, or may be a specific area including the department store, the theater and the hotel, or may be a specific region inside the department store, the theater and the hotel.

For connection to the network, wired or wireless communication methods may be used. As the wireless communication methods, used are short-range wireless communication methods such as Wi-Fi, Bluetooth and NFC/RFID. However, 3G mobile communications, Long Term Evolution (LTE) which is the next generation mobile communication, WiMAX, etc. may be also used.

The service information indicates information which can be provided from a service zone, such as a service corresponding to the service zone, a service list, and contents for a corresponding service. Here, the service corresponding to the service zone may be represented in a various manner, e.g., in the form of icons, images and texts.

The zone casting application is an application program for receiving a zone casting service, and can be used anywhere in the service zone. That is, the zone casting application indicates an application which can be used anywhere in a service zone where a zone casting service is provided. The zone casting application may be pre-stored, or may be automatically or manually executed by a user when the mobile terminal has entered the service zone. Here, the term of 'automatically' indicates that an application program is automatically implemented when the mobile terminal has entered a service zone. And, the term of 'manually' indicates that an application program is implemented by being downloaded from a server by a user.

A System for Providing a Zone Casting Service

Figure 1:
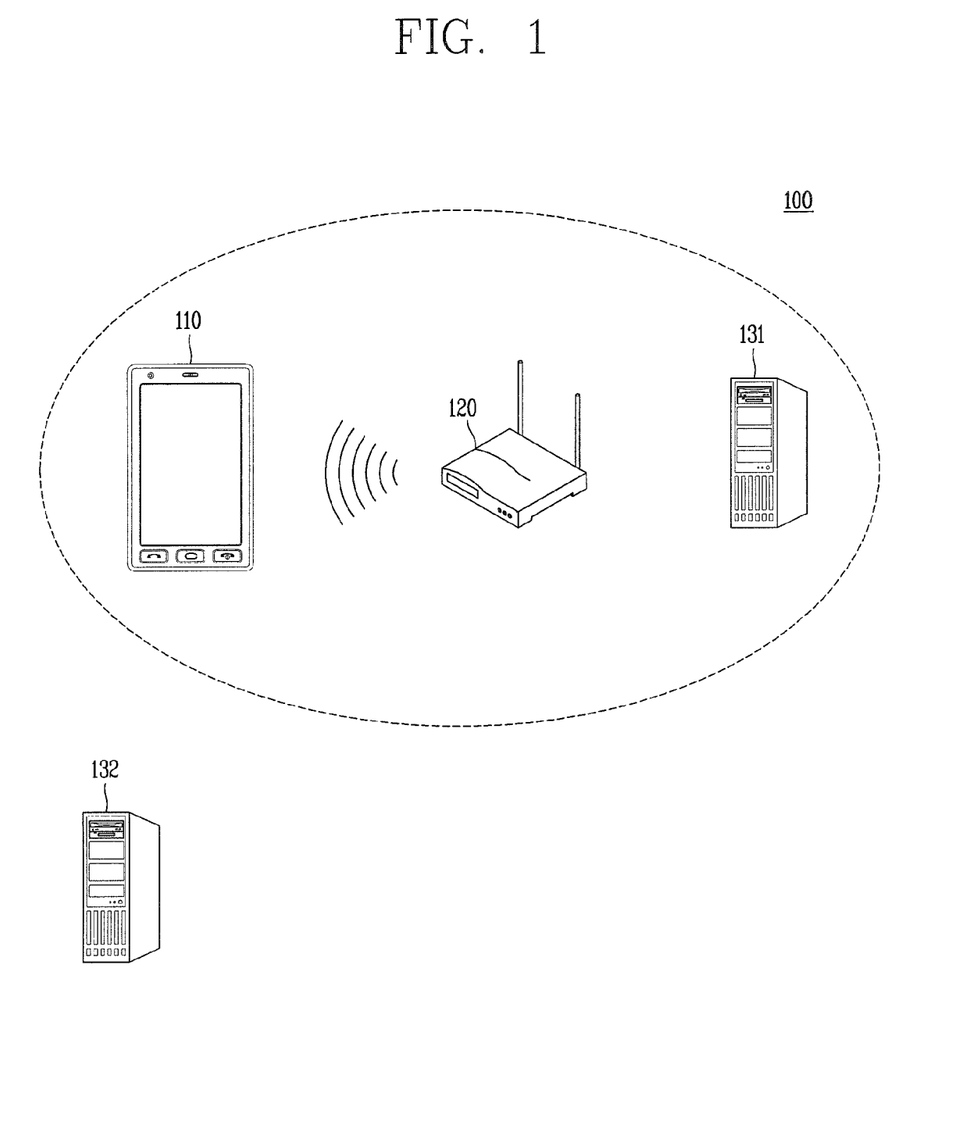
FIG. 1 is a conceptual view of a zone casting service according to one embodiment of the present invention.

FIG. 1 is a conceptual view of a zone casting service according to one embodiment of the present invention.

Firstly, a wireless LAN system will be explained in brief.

A wireless LAN system may include a mobile terminal, and a plurality of access points (AP) capable of providing a wireless communication service by being connected to the mobile terminal. The wireless LAN system may further include a router for performing a routing process according to IP address information, a Dynamic Host Configuration Protocol Server (DHCP) server for allocating and managing an IP address, a Session Initiation Protocol (SIP) proxy server for storing and managing neighboring APs with respect to an AP in the form of a table, and an authentication server (AS) for authenticating a mobile terminal and APs according to a 802.1X protocol.

The wireless LAN system may adopt an IEEE 802.11 protocol, and may use a service set identifier (SSID) or a basic service set identifier (BSSID) as an identifier. The SSID is an identifier uniquely allocated to each wireless LAN system, which allows a plurality of wireless LAN systems to operate in the same place at the same time.

The same SSID is allocated to the mobile terminal and the AP of the wireless LAN system. The BSSID is a Medium Access Control (MAC) address uniquely allocated to each access point (AP) of the wireless LAN system, which is used to identify each access point at a module for processing the IEEE 802.11 protocol of each component of the wireless LAN system.

The mobile terminal detects neighboring access points according to a periodic AP detection signal. That is, the mobile terminal consecutively scans channels provided from the wireless LAN system. Then, the mobile terminal detects an access point which operates at a channel having a highest RSS (received signal strength) or a highest SNR (signal to noise ratio), and sets the detected AP as an AP for connection. Once a signal for connecting the mobile terminal to the set AP is input, the mobile terminal undergoes an authentication process to be connected to the established AP.

The system 100 for providing a zone casting service comprises the mobile terminal 110, a server and an access point 120.

The mobile terminal 110 is an apparatus for receiving service information corresponding to a service zone, and displaying the received service information to a user. Here, the mobile terminal may pre-store a zone casting application for receiving the aforementioned zone casting service. The zone casting application may be automatically executed, or may be downloaded or installed by a user when the mobile terminal has entered a service zone.

The mobile terminal having entered the service zone may inform the user whether a zone casting service can be provided from the service zone, through one of a visual signal, an auditory signal and a tactile signal. For instance, the mobile terminal informs the user, that a zone casting service can be provided, through texts, images, icons, vibrations, voices, etc.

Once the user has inputted information requesting for a zone casting service, the mobile terminal searches for access points corresponding to the service zone, and is connected to a server inside the service zone through one of the searched access points. After being connected to the server, the mobile terminal is provided with service information stored in the server. Here, the server is a part of a network built in the service zone. Connecting to the server means connecting to the network. Therefore, connecting to the server is hereinafter interpreted to have the same meaning as connecting to the network.

Inputting request information by the user means executing a zone casting application. The request information may be input in a various manner, e.g., through a voice, through selection of a zone casting application displayed on a screen, through motions of the mobile terminal, etc.

The server consists of a local server 131 inside a service zone, and an external server 132 outside a service zone.

The local server 131 is a server installed in a service zone, and stores service information corresponding to a service zone. The local server 131 also provides the service information stored therein to the mobile terminal connected thereto.

The local server 131 stores therein service information corresponding to a service zone in a various manner, e.g., according to a service type, a service providing place, etc. Here, the information stored in the local server corresponds to service information provided from a place or a specific region including the local server, i.e., a service zone.

For instance, when a service zone is a hotel, the local server stores service information provided from the hotel in a database. Here, the service information may include information on neighboring areas of the hotel, information on room services, information on restaurants located in the hotel, etc.

The local server 131 stores therein information on access points installed at a corresponding service zone. More concretely, the local server stores therein information on a service set identifier (SSID) or a basic service set identifier (BSSID) of an access point.

The external server 132 indicates a server for storing, in a database, position information of a service zone from which a zone casting service is provided. The external server 132 is generally located outside a service zone where the mobile terminal has entered. However, the external server 132 may be located inside the service zone.

When the mobile terminal is located outside the service zone, the mobile terminal may be provided, from the external server, information on a position of a nearest service zone which provides a zone casting service. More concretely, after the mobile terminal transmits its position information measured by a GPS receiver to the external server, the mobile terminal receives, from the external server, information on positions of service zones which provide a zone casting service.

In this case, the mobile terminal is connected to the external server through various communications such as a short-range communication and a mobile communication.

The access point (AP) 120 corresponds to a wireless communication device for connecting to the local server 131. In this case, the access point uses an independent power, and is provided with a module capable of performing a short-range communication. Location information of an area where the access point has been installed is stored in the local server. In the present invention, the mobile terminal is connected to the local server by using a Wi-Fi wireless access method. However, the mobile terminal may be connected to the local server by using a short-range communication method such as NFC/RFID, ZigBee and Bluetooth.

Hereinafter, will be explained a case that a zone casting application is pre-stored (already mounted) in the mobile terminal in more detail.

Figure 2:
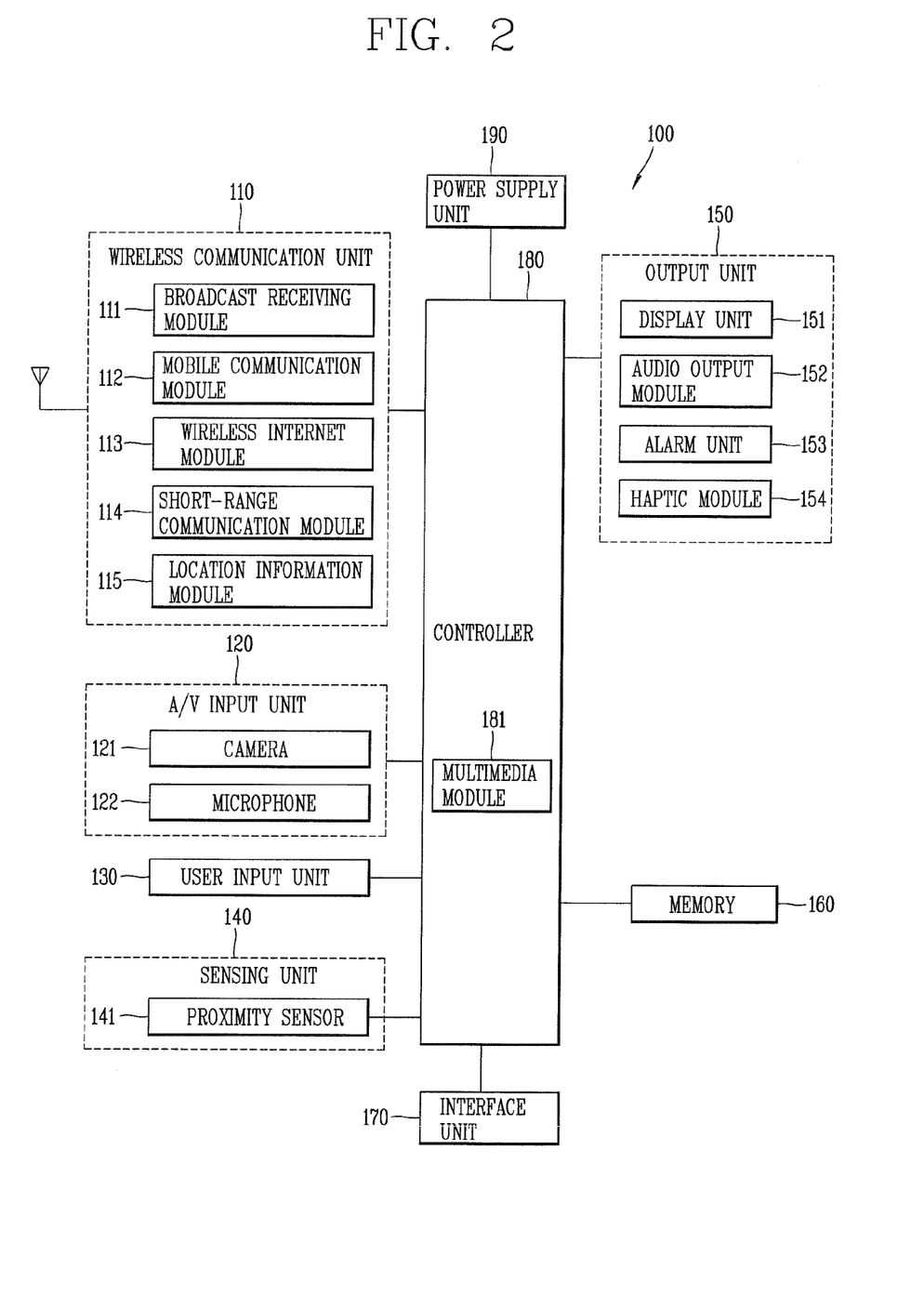
FIG. 2 is a block diagram of a mobile terminal according to one embodiment of the present invention.

FIG. 2 is a block diagram of a mobile terminal according to one embodiment of the present invention.

The mobile terminal 110 may comprise a wireless communication unit 210, an A/V input unit 220, a user input unit 230, a sensing unit 240, an output unit 250, a memory 260, an interface unit 270, a controller 280, a power supply unit 290, etc. FIG. 2 shows the mobile terminal 110 having various components, but it is understood that implementing all of the illustrated components is not a requirement. The mobile terminal 110 may be implemented by greater or fewer components.

Hereinafter, the components will be explained in more detail.

The wireless communication unit 210 may include one or more modules allowing radio communication between the mobile terminal 110 and a wireless communication system or a network in which the mobile terminal 110 is located. That is, the wireless communication unit 210 may include a transmitter and a receiver. For example, the wireless communication unit 210 may include at least one of a broadcast receiving module 211, a mobile communication module 212, a wireless Internet module 213, a short-range communication module 214, a location information module 115, etc.

The receiver may be configured to receive a service set identifier (SSID) or a basic service set identifier (BSSID) from an access point.

The broadcast receiving module 211 receives broadcast signals and/or broadcast associated information from an external broadcast management server via a broadcast channel.

The broadcast channel may include a satellite channel and/or a terrestrial channel. The broadcast management server may be a server that creates and transmits a broadcast signal and/or broadcast associated information or a server that receives a previously created broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

The broadcast associated information may refer to information associated with a broadcast channel, a broadcast program or a broadcast service provider. The broadcast associated information may also be provided via a mobile communication network and, in this case, the broadcast associated information may be received by the mobile communication module 212.

The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 211 may be configured to receive signals broadcast by using various types of broadcast systems. In particular, the broadcast receiving module 211 may receive a digital broadcast by using a digital broadcast system such as multimedia broadcasting-terrestrial (DMB-T), digital multimedia broadcasting-satellite (DMB-S), digital video broadcast-handheld (DVB-H), integrated services digital broadcast-terrestrial (ISDB-T), etc. The broadcast receiving module 211 may be configured to be suitable for every broadcast system that provides a broadcast signal as well as the above-mentioned digital broadcast systems.

Broadcast signals and/or broadcast-associated information received via the broadcast receiving module 211 may be stored in the memory 160.

The mobile communication module 212 transmits and/or receives radio signals to and/or from at least one of a base station, an external terminal and a server. Such radio signals may include a voice call signal, a video call signal or various types of data according to text and/or multimedia message transmission and/or reception.

The wireless Internet module 213 indicates a module for wireless Internet access. This module may be internally or externally coupled to the mobile terminal 110. Here, as the wireless Internet technique, a wireless local area network (WLAN), Wi-Fi, wireless broadband (WiBro), world interoperability for microwave access (WiMAX), high speed downlink packet access (HSDPA), and the like, may be used.

The short-range communication module 214 is a module for supporting short range communications. Some examples of short-range communication technology include Bluetooth, Radio Frequency IDentification (RFID), Infrared Data Association (IrDA), Ultra-WideBand (UWB), ZigBee, and the like.

The location information module 215 is a module for checking or acquiring a location (or position) of the mobile terminal, and may include a GPS (Global positioning system) module.

Referring to FIG. 2, the AN input unit 220 is configured to receive an audio or video signal. The A/V input unit 220 may include a camera 221 and a microphone 222. The camera 221 processes image data of still pictures or video acquired by an image capture device in a video capturing mode or an image capturing mode. The processed image frames may be displayed on a display unit 251.

The image frames processed by the camera 221 may be stored in the memory 260 or transmitted via the wireless communication unit 210. Two or more cameras 221 may be provided according to the configuration of the mobile terminal.

The microphone 222 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 212 in case of the phone call mode. The microphone 222 may implement various types of noise canceling (or suppression) algorithms to cancel (or suppress) noise or interference created in the course of receiving and transmitting audio signals.

The user input unit 230 may create key input data from commands entered by a user to control various operations of the mobile terminal. The user input unit 230 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like.

The sensing unit 240 detects a current status (or state) of the mobile terminal 110 such as an opened or closed state of the mobile terminal 110, a location of the mobile terminal 110, the presence or absence of user contact with the mobile terminal 110 (e.g., touch inputs), the orientation of the mobile terminal 110, an acceleration or deceleration movement and direction of the mobile terminal 110, etc., and creates commands or signals for controlling the operation of the mobile terminal 110. For example, when the mobile terminal 110 is implemented as a slide type mobile phone, the sensing unit 240 may sense whether the slide phone is opened or closed. In addition, the sensing unit 240 can detect whether or not the power supply unit 290 supplies power or whether or not the interface unit 270 is coupled with an external device. The sensing unit 240 may include a proximity sensor 241.

The output unit 250 is configured to provide outputs in a visual, audible, and/or tactile manner, and may include the display unit 251, an audio output module 252, an alarm unit 253, a haptic module 254, and the like.

The display unit 251 may display information processed in the mobile terminal 110. For example, when the mobile terminal 110 is in a phone call mode, the display unit 251 may display a User Interface (UI) or a Graphic User Interface (GUI) associated with a call or other communication. The display unit 251 displays objects (short-cut icons) on a background screen under control of the controller.

When the mobile terminal 110 is in a video call mode or image capturing mode, the display unit 251 may display a captured image and/or received image, a UI or GUI that shows videos or images and functions related thereto, and the like.

When a sensor (referred to as a 'touch sensor', hereinafter) for detecting a touch operation of the display unit 251 is overlaid in a layered manner (referred to as a 'touch screen'), the display unit 251 may function as both an input device and an output device. The touch sensor may have, for example, the form of a touch film, a touch sheet, a touch pad, and the like.

The touch sensor may be configured to convert the pressure applied to a particular portion of the display unit 251 or a change in capacitance created at a particular portion of the display unit 251 into an electrical input signal. The touch sensor may be configured to detect a touch input pressure as well as a touch input location and a touch input area.

When there is a touch input with respect to the touch sensor, the corresponding signal(s) are sent to a touch controller. The touch controller processes the signal(s) and transmits corresponding data to the controller 280. Accordingly, the controller 280 can recognize a touched region of the display unit 251.

Referring to FIG. 2, the proximity sensor 241 may be disposed within the mobile terminal covered by the touch screen or near the touch screen. The proximity sensor 241 refers to a sensor for detecting the presence or absence of an object that accesses a certain detect surface or an object that exists nearby by using the force of electromagnetism or infrared rays without a mechanical contact. Thus, the proximity sensor 241 has a longer life span compared with a contact type sensor, and it can be utilized for various purposes.

Recognition of a pointer located to be close to the touch screen without being in contact with the touch screen will be called a 'proximity touch', while recognition of actual contacting of a pointer on the touch screen will be called a 'contact touch'. In this case, when the pointer is in the state of the proximity touch, it means that the pointer is located to correspond vertically to the touch screen.

The proximity sensor 241 may detect a proximity touch and a proximity touch pattern (e.g., a proximity touch distance, a proximity touch speed, a proximity touch time, a proximity touch location, a proximity touch movement state, or the like), and output information corresponding to the detected proximity touch operation and the proximity touch pattern to the touch screen.

The audio output module 252 may convert and output as sound audio data received from the wireless communication unit 210 or stored in the memory 260 in a call signal reception mode, a call mode, a record mode, a voice recognition mode, a broadcast reception mode, and the like. Also, the audio output module 252 may provide audible outputs related to a particular function performed by the mobile terminal 110 (e.g., a call signal reception sound, a message reception sound, etc.). The audio output module 252 may include a receiver, a speaker, a buzzer, etc.

The alarm unit 253 may provide outputs to inform about the occurrence of an event of the mobile terminal 110. Typical events may include call reception, message reception, key signal inputs, a touch input, etc. In addition to audio or video outputs, the alarm unit 253 may provide outputs in a different manner to inform about the occurrence of an event. For example, the alarm unit 253 may provide an output in the form of vibrations (or other tactile or sensible outputs). When a call, a message, or some other incoming communication is received, the alarm unit 253 may provide tactile outputs (e.g., vibrations) to inform the user thereof. By providing such tactile outputs, the user can recognize the occurrence of various events. Outputs informing about the occurrence of an event may be also provided via the display unit 251 or the audio output module 252.

A haptic module 254 creates various tactile effects the user may feel. A typical example of the tactile effects created by the haptic module 254 is vibration. The strength and pattern of the haptic module 254 can be controlled. For example, different vibrations may be combined to be outputted or sequentially outputted.

Besides vibration, the haptic module 254 may create various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or create heat.

The haptic module 254 may be implemented to allow the user to feel a tactile effect through a muscle sensation such as fingers or arm of the user, as well as transferring the tactile effect through a direct contact. Two or more haptic modules 254 may be provided according to the configuration of the mobile terminal 110.

The memory 260 may store programs used for the processing and controlling operations performed by the controller 280, or may temporarily store data (e.g., a phonebook, messages, still images, video, etc.) that is inputted or outputted. The memory 260 may store data relating to various types of vibrations and sounds outputted when touch input is performed on the touch screen 251. The memory 260 includes a buffer for temporarily storing data.

The memory 260 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 110 may be operated in relation to a web storage device that performs the storage function of the memory 260 over the Internet.

The interface unit 270 serves as an interface with every external device connected with the mobile terminal 110. For example, the external devices may transmit data to an external device, receives and transmits power to each element of the mobile terminal 110, or transmits internal data of the mobile terminal 110 to an external device. For example, the interface unit 270 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating the authority of using the mobile terminal 110 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the mobile terminal 110 via a port.

When the mobile terminal 110 is connected with an external cradle, the interface unit 270 may serve as a conduit to allow power from the cradle to be supplied there through to the mobile terminal 110 or may serve as a conduit to allow various command signals inputted from the cradle to be transferred to the mobile terminal there through. Various command signals or power inputted from the cradle may operate as signals for recognizing when the mobile terminal is properly mounted on the cradle.

The controller 280 typically controls the general operations of the mobile terminal. For example, the controller 280 performs controlling and processing associated with voice calls, data communications, video calls, and the like.

When a service set identifier (SSID) or a basic service set identifier (BSSID) has been received from an access point for a preset time, the controller of the present invention creates a message requesting for service identification information corresponding to the received SSID or the BSSID, and transmits the created message to a server. Then, the controller controls the mobile terminal to create one or more objects based on the service identification information received from the server.

Also, the controller controls the display unit to display the created object.

Also, the controller controls the receiver to receive service information corresponding to a service zone from the server when the created object has been executed.

The controller 280 may include a multimedia module 281 for reproducing multimedia data. The multimedia module 281 may be configured within the controller 280 or may be configured to be separated from the controller 280.

The controller 280 may perform a pattern recognition processing to recognize a handwriting input or a picture drawing input performed on the touch screen 251 as characters or images.

The power supply unit 290 receives external power or internal power and supplies appropriate power required for operating respective elements and components under control of the controller 280.

Processes described herein may be implemented in a computer-readable or its similar medium using, for example, software, hardware, or any combination thereof.

For hardware implementation, the processes may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units designed to perform the functions described herein. In some cases, such processes may be implemented by the controller 180 itself.

For software implementation, the processes, such as procedures or functions, may be implemented together with separate software modules that allow performing of at least one function or operation. Software codes can be implemented by a software application (or program) written in any suitable programming language. The software codes may be stored in the memory 260 and executed by the controller 280.

Figure 3:
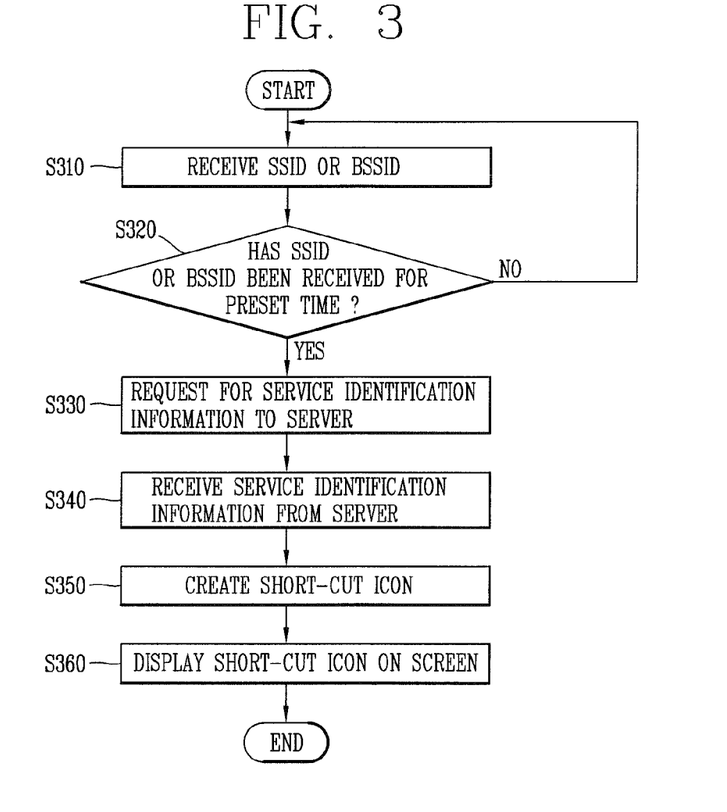
FIG. 3 is a flowchart showing an operation of a mobile terminal for creating and displaying short-cut icons according to one embodiment of the present invention.

FIG. 3 is a flowchart showing an operation of a mobile terminal for creating and displaying short-cut icons according to one embodiment of the present invention;

Firstly, the mobile terminal receives a service set identifier (SSID) or a basic service set identifier (BSSID) from an access point (S310). Here, the SSID or the BSSID includes a prefix for indicating that a zone casting service is being provided. For instance, the SSID including the pre-fix may be indicated as ZC_Konziam.

The access point periodically broadcasts the SSID or the BSSID. Accordingly, the mobile terminal which is in a range to communicate with the access point periodically receives the SSID or the BSSID broadcast from the access point.

Then, the mobile terminal determines whether the SSID or the BSSID has been received for a preset time (S320). Here, the preset time may be changed by a user.

If it is determined that the SSID or the BSSID has been received for a preset time, the mobile terminal transmits, to a server, a message requesting for service identification information corresponding to the received SSID or BSSID (S330). Here, the server indicates a server inside a service zone. When the mobile terminal has entered a service zone or is located near a service zone, the mobile terminal can receive an SSID or a BSSID for a preset time. For instance, the service zone indicates an area which provides a zone casting service.

The service identification information indicates information including at least one of a service name, a uniform resource locator (URL) and a service icon. That is, the mobile terminal requests for the information to the server so as to display, on a screen, information for identifying a service zone recognized through an SSID or a BSSID. For instance, when a service zone recognized through an SSID or a BSSID is a hotel, or when the hotel provides a zone casting service, the mobile terminal requests for a name, a URL and an icon image of the hotel, to the server. Here, the service zone may be a specific area inside the hotel, e.g., a room, a restaurant, a front, etc.

If it is determined that an SSID or a BSSID has not been received for a preset time, the mobile terminal periodically receives an SSID or a BSSID from an access point.

Then, the mobile terminal receives the requested service identification information from the server (S340).

Then, the mobile terminal creates an object based on the received service identification information (S350). Here, the object indicates short-cut icons for receiving service information corresponding to a service zone. That is, the object indicates a short-cut icon corresponding to the service identification information.

The service zone indicates an area where service information is provided from a server inside a network built at any place. The service information indicates information including at least one of a service corresponding to the service zone, a service list and contents for the corresponding service.

The service information is received from the server by using a URL when the object has been executed.

Then, the mobile terminal displays the created object on a screen (S360). More concretely, when the mobile terminal has entered a service zone which provides a zone casting service (or when the mobile terminal has received an SSID or a BSSID for a preset time), the mobile terminal creates the object by using a zone casting application pre-stored therein without downloading or installing an application corresponding to the service zone.

Figure 4:
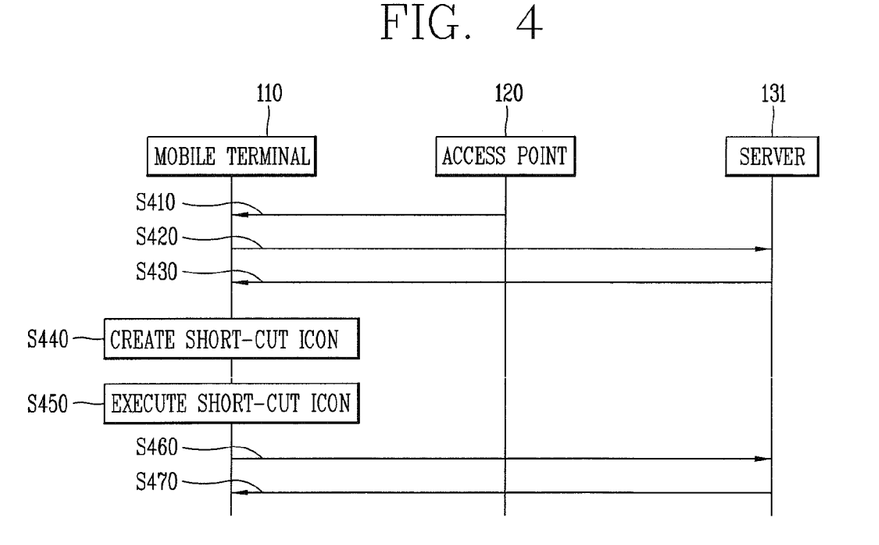
FIG. 4 is a flowchart showing signaling procedures for receiving service information corresponding to a service zone according to one embodiment of the present invention.

FIG. 4 is a flowchart showing signaling procedures for receiving service information corresponding to a service zone according to one embodiment of the present invention.

Firstly, an access point periodically broadcasts a prefix indicating that a zone casting service is being currently provided, and a service set identifier (SSID) indicating a name of the zone casting service (S410). Here, the access point may periodically broadcast a BSSID instead of the SSID. For instance, the SSID may be indicated as ZC_Konziam.

The mobile terminal receives the SSID broadcast from the access point. Then, the mobile terminal determines whether the SSID has been received for a preset time or not. Here, the preset time may be changed by a user.

If it is determined that the SSID has been received for a preset time, the mobile terminal transmits, to a server which provides a zone casting service, a message requesting for service identification information including at least one of a service name, a service URL and a service short-cut icon (S420). The server transmits the requested service identification information to the mobile terminal (S430).

The mobile terminal creates a short-cut icon including a service icon image, a service name, and a service URL, on a background screen, based on the service identification information received from the server (S440). Here, the short-cut icon indicates a short-cut icon for receiving service information corresponding to a service zone.

Once the created short-cut icon is executed by a user (S450), the mobile terminal is connected to the server to receive service information corresponding to a service zone from the server (S470). More concretely, service URL information is transmitted to a server inside a service zone (S460), the mobile terminal receives the service URL information from the server (S470).

That is, once a user executes the created short-cut icon, a zone casting service application is executed, and service URL information is transmitted to the mobile terminal in the form of a parameter. Accordingly, when the zone casting application is executed, the mobile terminal receives service information from the server by directly moving to a received service URL without moving to an initial screen.

The service zone indicates an area where service information is provided from a server inside a network built at any place. The service information indicates information including at least one of a service corresponding to the service zone, a service list and contents for the corresponding service.

FIG. 5 is a view showing that short-cut icons are created to be displayed on a screen according to one embodiment of the present invention.

Figure 5A:
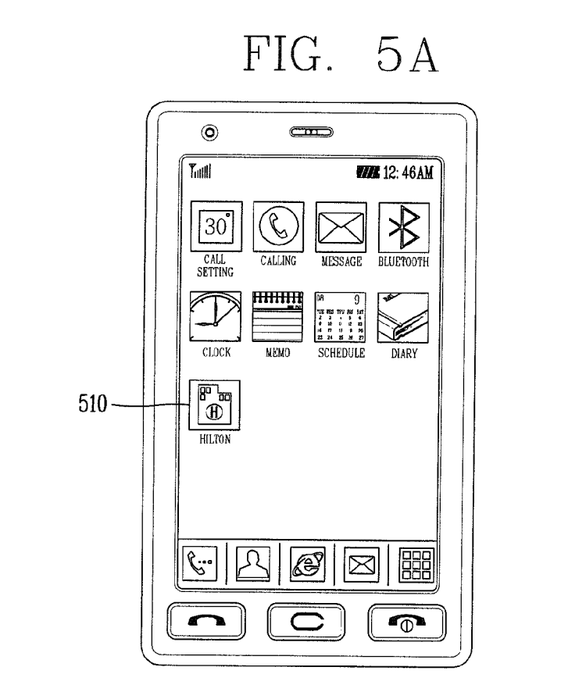
FIG. 5 is a view showing that short-cut icons are created to be displayed on a screen according to one embodiment of the present invention.
Figure 5B:
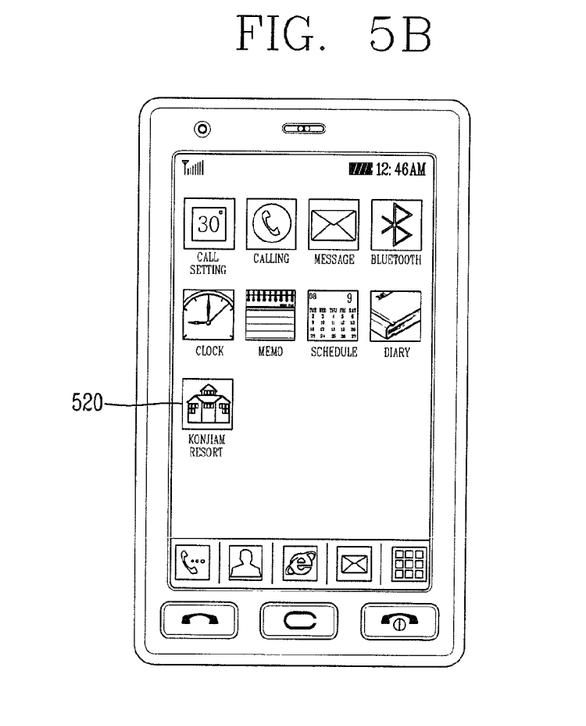

FIG. 5A shows a service zone of the Hilton hotel, and FIG. 5B shows a service zone of the KONJIAM resort.

Referring to FIG. 5A, will be explained a case that a service zone is a hotel, i.e., a service provided to the mobile terminal corresponds to a hotel.

The mobile terminal receives, from an access point installed inside a hotel, an SSID including a prefix indicating that the hotel provides a zone casting service. Based on the received SSID, the mobile terminal requests for a name, a URL, and an icon image of the hotel, from a server inside the hotel. Then, the mobile terminal receives the requested information from the server.

As shown in FIG. 5A, the mobile terminal creates a short-cut icon 510 indicating the requested information, on a background screen, based on the information received from the server, i.e., service identification information.

If the created short-cut icon is executed by a user, the mobile terminal receives service information corresponding to the hotel from the server inside the hotel. Here, the service information may be received by using a URL.

FIG. 5B is a view showing a short-cut icon 520 is displayed on a background screen when a service zone is KONJIAM resort.

If an SSID corresponding to a created short-cut icon has not been received for a preset time, the mobile terminal may automatically delete the created short-cut icon.

If the mobile terminal receives a plurality of SSIDs including a prefix indicating that a specific area provides a zone casting service, the mobile terminal may execute the operation shown in FIG. 3 with respect to all of the received SSIDs.

Here, the mobile terminal may be firstly connected to a server having the strongest signal strength from an access point. Then, the mobile terminal may be connected to another server having a next strongest signal strength, sequentially.

It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

The invention claimed is:

1. A method for providing a service in a service zone in a mobile terminal, the method comprising:
   entering the service zone in which a zone casting service is provided;
   receiving, from an access point, a service set identifier or a basic service set identifier;
   when the service set identifier or the basic service set identifier has been received for a preset time, transmitting, to a server, a message requesting for service identification information corresponding to the received service set identifier or basic service set identifier;
   receiving, from the server, the service identification information, which includes at least one of a service name, a service uniform resource locator and a service icon corresponding to the service zone;
   creating a short-cut icon for receiving service information corresponding to the service zone based on the received service identification information by using a zone casting application pre-stored therein without downloading or installing an application corresponding to the service zone;

adding the short-cut icon, which includes the service uniform resource locator for connecting to the server, into an idle screen which contains application icons configured to execute applications; and deleting by the mobile terminal automatically the short-cut icon on the idle screen when the service set identifier or the basic service set identifier corresponding to the short-cut icon has not been received for a preset time.

2. The method of claim 1, further comprising receiving service information corresponding to the service identification information when a user input is detected on the short-cut icon.

3. The method of claim 1, wherein the service set identifier or the basic service set identifier comprises a prefix for indicating that the zone casting service is being currently provided, and further comprising informing the user using the prefix whether the zone casting service can be provided from the service zone through one of a visual signal, an auditory signal and a tactile signal.

4. The method of claim 2, wherein the service information comprises at least one of a service corresponding to the service identification information, a service list and contents for a corresponding service.

5. A mobile terminal, comprising:

a receiver configured to receive a service set identifier or a basic service set identifier from an access point when the mobile terminal has entered a service zone, the service set identifier or the basis service set identifier comprising a prefix indicating that a zone casting service is being currently provided;

a controller configured to:

transmit, to a server, a message requesting for service identification information which comprises at least one of a service name, a service uniform resource locator and a service icon corresponding to the service zone when the service set identifier or the basic service set identifier has been received for a preset time, create a short-cut icon for receiving service information corresponding to the service zone based on the service identification information received from the server by using a zone casting application pre-stored therein without downloading or installing an application corresponding to the service zone, add the short-cut icon, which includes the service uniform resource locator for connecting to the server, into an idle screen which contains application icons configured to execute applications, delete automatically the short-cut icon on the idle screen when the service set identifier or the basic service set identifier corresponding to the short-cut icon has not been received for a preset time, and inform the user using the prefix whether the zone casting service is provided in the service zone through at least one of a visual signal, an auditory signal and a tactile signal; and a display unit configured to display the idle screen which contains the short-cut icon under control of the controller.

6. The mobile terminal of claim 5, wherein the controller controls the receiver to receive service information corresponding to the service zone from the server when a user input is detected on the short-cut icon.

* * * * *